United States Patent [19]

Hormann

[11] Patent Number: 4,726,247
[45] Date of Patent: Feb. 23, 1988

[54] GEAR FOR CONVERTING A ROTATIONAL INTO A TRANSLATIONAL MOTION

[75] Inventor: Michael Hormann, Steinhagen, Fed. Rep. of Germany

[73] Assignee: Hörmann KG Antriebs- und Steuerungstechnik, Harsewinkel, Fed. Rep. of Germany

[21] Appl. No.: 735,315

[22] Filed: May 17, 1985

[30] Foreign Application Priority Data

May 24, 1984 [DE] Fed. Rep. of Germany ....... 3419477

[51] Int. Cl.$^4$ ............................................. F16H 1/18
[52] U.S. Cl. ......................................... 74/424.6; 49/325
[58] Field of Search ............. 49/325; 74/424.5, 424.6, 74/425, 424.7

[56] References Cited

U.S. PATENT DOCUMENTS

| | | | |
|---|---|---|---|
| 1,850,160 | 3/1932 | Sundback | 24/405 |
| 1,901,789 | 3/1933 | Wimberley | 49/325 |
| 2,574,657 | 11/1951 | Pierce | 74/424.6 |
| 2,867,878 | 1/1959 | Sundback | 24/390 |
| 3,511,920 | 5/1970 | Hertfelder | 74/425 |
| 3,641,832 | 2/1972 | Shigeta et al. | 74/427 |
| 3,848,298 | 11/1974 | Frohlich | 24/399 |
| 4,210,031 | 7/1980 | Schmid | 74/89.21 |
| 4,311,225 | 1/1982 | Tsubaki et al. | 74/89.21 |
| 4,473,365 | 9/1984 | Lapeyre | 474/242 |
| 4,502,190 | 3/1985 | Inamura | 24/403 |
| 4,521,993 | 6/1985 | Tacheny et al. | 49/325 |

FOREIGN PATENT DOCUMENTS

| | | | |
|---|---|---|---|
| 2162938 | 6/1973 | Fed. Rep. of Germany . | |
| 422781 | 1/1935 | United Kingdom | 49/325 |
| 466786 | 6/1937 | United Kingdom | 49/325 |

Primary Examiner—Lawrence Staab
Attorney, Agent, or Firm—Max Fogiel

[57] ABSTRACT

An actuator has a worm gear which drives a pair of flexible parts into a guide where they are united to form a rigid transmission member. The parts have interlocking teeth which cooperate with each other to transmit stresses in compression and tension along the transmission member. Because the parts are flexible in a direction transverse to the direction of the guide, they may be stored in a space-saving manner to the sides of the guide.

10 Claims, 7 Drawing Figures

GEAR FOR CONVERTING A ROTATIONAL INTO A TRANSLATIONAL MOTION

Known gears of this type are, for example, crank gears which, however, are restricted in their translational working range to the diameter of the crank wheel and have corresponding space requirements. Furthermore, draag-chain drives are known but these require two guide wheels because of the chain of endless construction and have a comparatively large mass, apart from the fact that the guiding of the chain in the region of the longitudinal strands can involve problems. Finally, in known rack and pinion drives, the rack needs double the space in the direction of the translation movement of its driven point. In theory, the engagement between the rotary member and the component displaced translationally can be effected frictionally but this means the risk of slip or the use of heavy contact pressure.

It is the object of the invention to provide a gear of the type mentioned at the beginning which is simple in design for tensile and compressive stressing and is constructed with low friction and a small mass.

The construction of the gear according to the invention is distinguished by the fact that the transforming of a rotational into a translational motion is effected with particularly low friction and offers the possibility of making available a reciprocating translational motion without endless members such as chains for example, although such a construction is also possible with the gear according to the invention. What is important is that the motion transmission member moved in translation can be stressed both in compression and in tension. The generally positive consrtruction of the transmission section between the rotary drive and the motion transmission member and also its positive coupling lead to a motional behaviour which is free of slip and therefore can be determined precisely.

It is essential to the invention that the motion transmission member is of two or more part construction and is only united to form the acutal power transmission member within the guide. The individual parts can be stored in a space-saving manner as a result of their mobility transverely to the longitudinal direction of the guide, either in the form of a drum or in the form of a return parallel to the direction of the guide.

The geared connection between the drive motor and the motion transmission member, in the form of a worm, drive, is a particular advantage. A reduction gear can be saved as a result. The worm is driven directly from the motor shaft; the ratio between worm and the "worm-gear thread" in the parts of the motion transmission device—in halves with two parts—provides the particularly high reduction typical of worm drives.

The toothed engagement between the two or more parts of the motion transmission member leads to the fact that, after they are united, a positive connection is established in the direction of movement and leads to the fact that the power transmission is effected via the tooth flanks and so does not load the holding means of segments stuck onto a deformable belt for example. In this case, the teeth may be constructed in such a manner that practically no components of force arise transversely to the direction of movement so that the frictional loading inside the guide is negligibly low.

For relatively small loads, particularly tensile loads, the two parts of the motion transmission device are constructed in the form of belts which are provided with teeth in an uninterrupted manner. The interengaging teeth unite the two parts of the motion transmission device, with regard to the compressive and tensile loading, inside the guide to form a whole, the teeth being constructed, in particular, in such a manner that they are constructed with undercutting between the teeth and the gaps between the teeth, in the manner of a zip fastener, and so do not exert any forces transversely to the longitudinal direction of the parts or of the motion transmission device inside the guide in the event of tensile and compressive loading. The production of such a drive is particularly simple, practically negligible with regard to the friction inside the guide and can be arranged in a space-saving manner because, taking this comparatively small tensile loading into consideration, the cross-sections of the two parts forming the motion transmission device in the united state, can be kept small outside the teeth. in this manner, comparatively tight deflections can be provided in the separating region of the two parts. In a particularly preferred embodiment, a thread is provided in the longitudinal direction between the teeth, in which thread a worm or screw engages which is directly connected to the rotor shaft of a drive motor. This means that both parts of the two-part motion transmission device each comprise half of a thread formed in the longitudinal direction of the parts for the worm and preferably in the middle region of the parts of the motion device in such a manner that a marginal strip with the teeth 9 remains at each side of the thread construction.

These and other preferred forms of embodiment of the invention can be seen from the sub-claims in conjunction with the examples of embodiment represented in the drawing, to which particular reference is made and the following description of which explains the invention in more detail.

Figure 1:
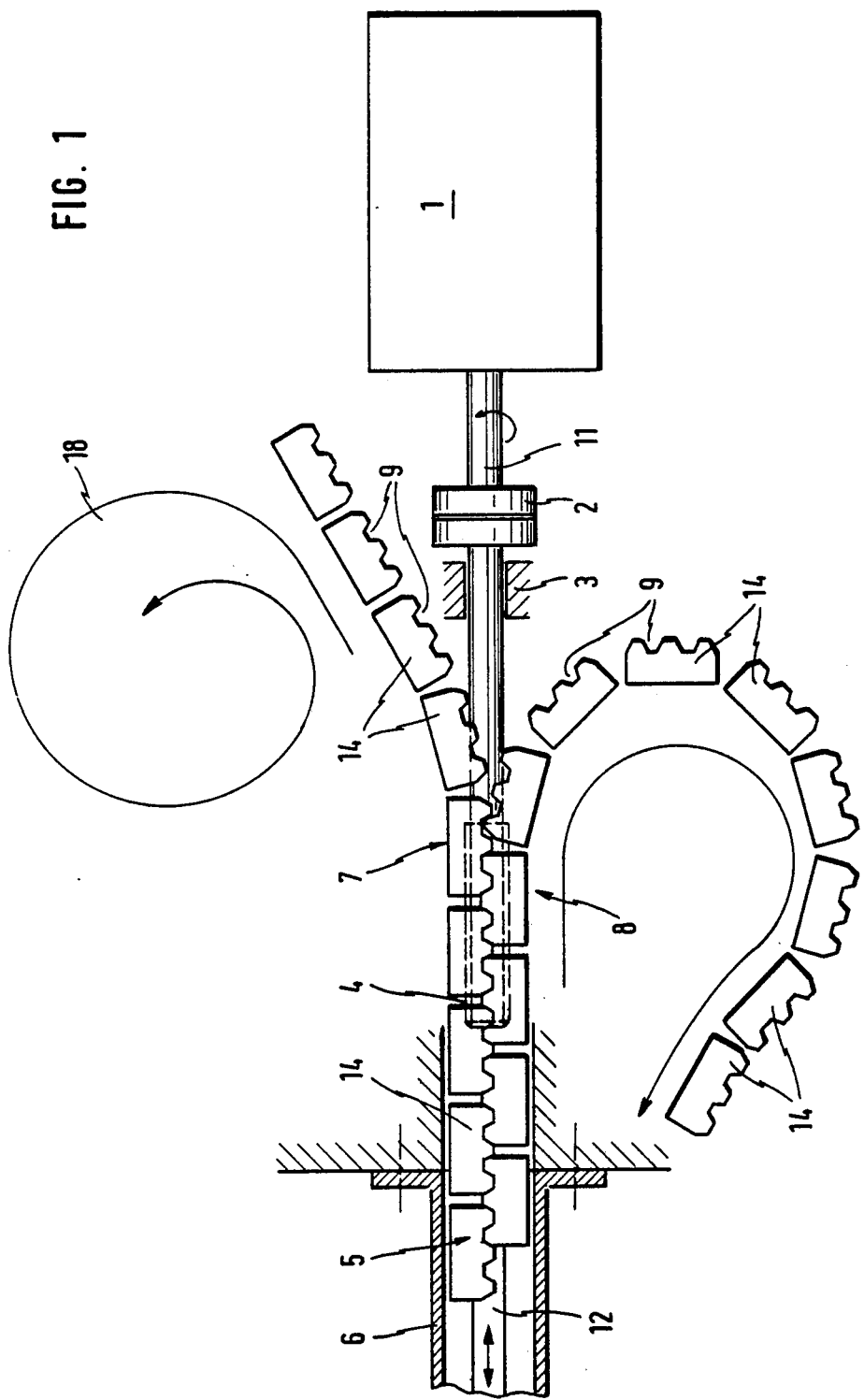
FIG. 1 shows a basic cross-sectional illustration of the gear.
Figure 2:
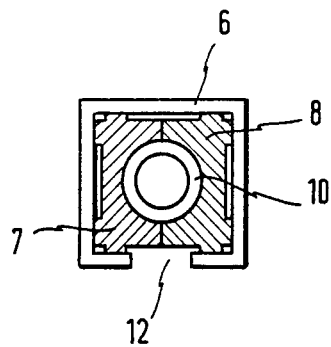
FIG. 2 shows a cross-sectional illustration in the region of the guide.

In FIG. 1, a drive motor 1 is illustrated, the drive shaft 11 of which ends in a worm 4 via a coupling 2 which is mounted at 3 as indicated diagrammatically. This worm engages in a corresponding screw thread, which is formed in halves in segments 14 of two parts 7 and 8 of a motion transmission member designated as a whole by 5. This motion transmission member 5 is guided in a straight line in a guide 6 which is illustrated broken away. The parts 7 and 8 of the motion transmission member 5 are forcibly brought together by guide surfaces before the region of engagement with the worm. The part 7 is stored in a drum indicated at 18, the part 8 is—here for demonstration—received in a store parallel to the guide 6.

The segments 14 of each part 7 and 8 of the motion transmission member 5 are provided, on their adjacent faces, with teeth 9 which are represented as being trapezoidal in the embodiment. These teeth 9 are preferably selected, however, so that the positive engagement with regard to the transmission of power in the direction of the guide 6 produces practically no components of force extending transversely to the longitudinal direction of the guide. This can easily be achieved with involute teeth or the like.

The guide 6 comprises a longitudinal slot 12 through which a drag member or the like is taken which establishes the connection between the end of the motion transmission member 5 remote from the drive motor and an object to be entrained in the direction of the guide 6.

In the region of the worm or its end adjacent to the motor shaft 11, the parts 7 and 8 of the motion member 5 are guided apart from one another and stored. In this manner, a space-saving arrangement of the whole drive device is achieved.

As a result of the high reduction ratio between the worm 4 and the screw thread 10 adapted to the worm, half of the screw thread being disposed in the segments 14 of the part 7 and half in the part 8 of the motion transmission member 5, no further reduction gear is necessary. This drive device can therefore be produced particularly economically.

It can easily be understood that a tensile and compressive load can be transmitted because of the teeth 9 through which the segments 14 of the parts 7 and 8 of the motion transmission device 5 interengage. As the drawing shows, the segments 14 of the parts 7 and 8 are staggered in relation to one another in such a manner that each segment 14 of the part 7 for example connects two adjacent segments 14 of the part 8 in a bridging manner. Thus the effect is achieved that tensile and compressive forces are transmitted exclusively via the teeth of the segments 14.

The segments 14 of the parts 7 and 8 of the motion transmission member 5 can be connected to one another in various ways, the connection serving only for the correct spacing of the segments 14, necessary with regard to the teeth 9 and otherwise enabling the parts 7 and 8 to be displaced perpendicular to the direction of the guide 6.

Figure 3:
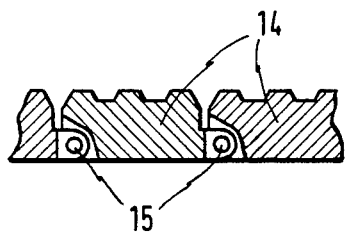
FIG. 3 shows a first method of connecting the segments of a part of the motion transmission device.

FIG. 3 shows a first embodiment of the connection between the segments 14 of a part 7 or 8 of the motion transmission member 5 by means of concrete hinges with pins 15.

Figure 4:
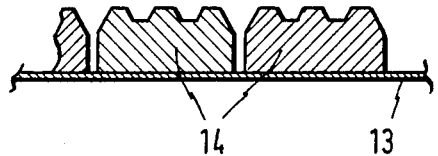
FIG. 4 shows a second example of the arrangement of the segments of a part of the motion transmission device on a belt.

FIG. 4 shows a second embodiment wherein the segments 14 are stuck to a belt 13 which can be deformed transversely to its illustrated longitudinal direction.

Figure 5:
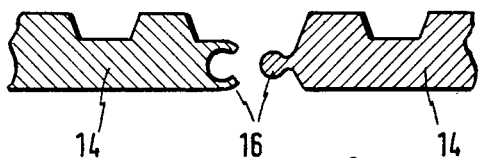
FIG. 5 shows another type of articulated connection between two segments of a part of the motion transmission device.

FIG. 5 shows the connection between two segments 14, particularly when they are made of plastics material, in the form of an articulated engagement 16.

Figure 6:
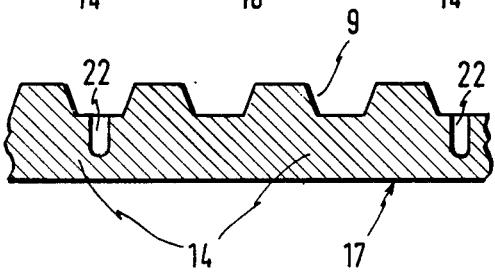
FIG. 6 shows the formation of the segments of a part of the motion transmission device set in a one-piece strip of belt.

FIG. 6 shows segments 14 obtained from a one-piece continuous belt 17, that is to say a toothed belt, during the production of which the precise construction of the toothing 9 is particularly simple and the delimitation of the segments by means of recesses 22 is achieved.

Figure 7:
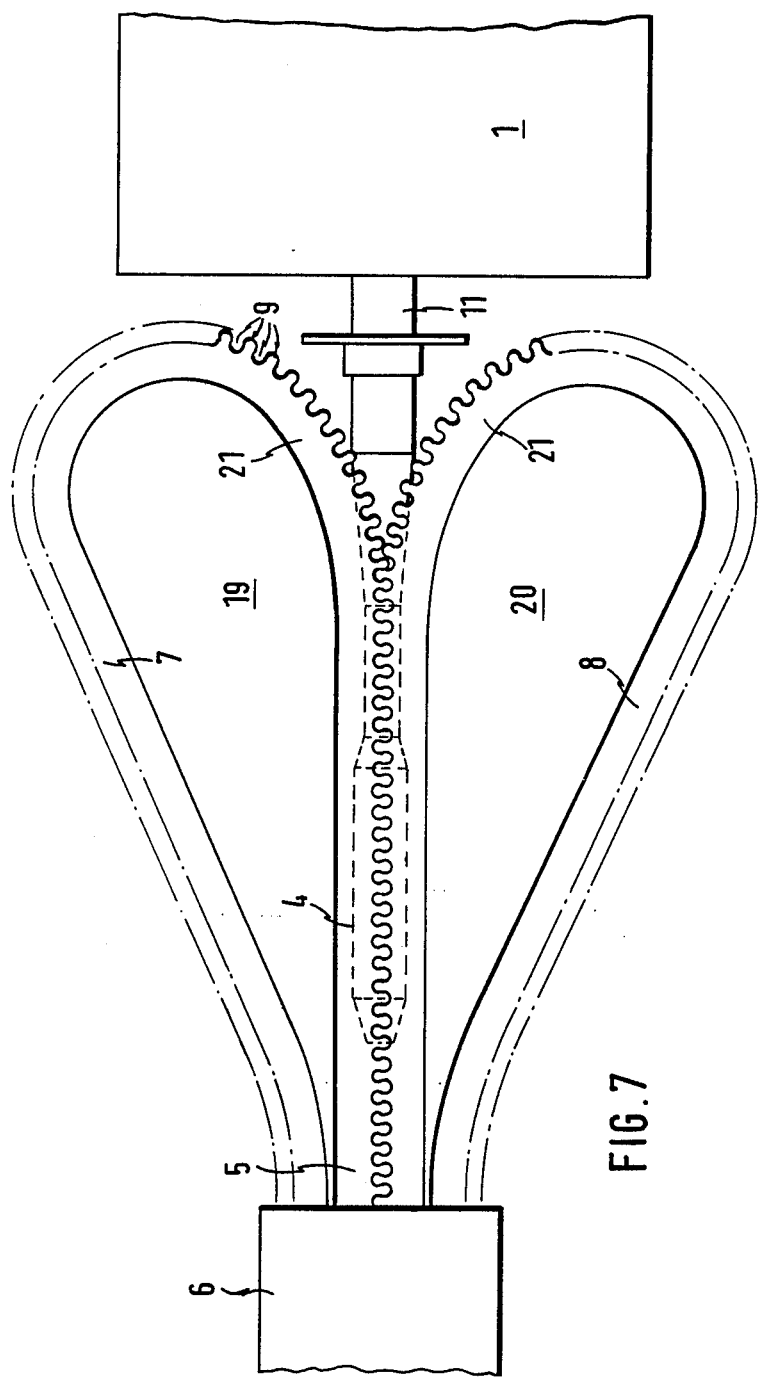
FIG. 7 shows a basic cross-sectional illustration of the gear with an alternative form of embodiment of the motion transmission device in the form of continuously constructed parts of the motion transmission device.

FIG. 7 shows a form of emdodiment such as may be provided in particular for relatively low compression loading and above all tensile loading, as, for example, for the motor-driven movement of windows and/or sliding roofs and the like of motor cars. The forces which occur in the compressive and tensile direction in this case are so low that the cross-section of the belts 21, which remains in the region of the parts 7 and 8 and outside the teeth 9, is quite sufficient to take up the tensile forces occurring in the region of the teeth and exerted on the motion transmission 1 member formed by uniting the parts 7 and 8 during this operation under compressive and tensile loading. In this case, the bolts 21 can be deflected, over a spatially narrow region, out of their longitudinal direction corresponding to the guide 6 and be brought into a store—18 in FIG. 1—or into a parallel position to the guide 6.

An overload safety device can be made particularly simply by making the spindle or worm 4 displaceable, under the reaction force of the motion transmission member hindered in its longitudinal displacement movement, against a resistance, particularly a spring. In this case, the spring tension indicates the load threshold beyond which a case of obstruction is assumed. The displacement can be used in a switching-off process for a drive motor, setting off an alarm and the like. In the case of a direct connection between the rotor of a drive motor 1 and the spindle or worm 4, the motor, or at least its rotor may be correspondingly adapted for displacement in the longitudinal direction of the axis of rotation, as a result of which an alarm signal or switching-off signal can be released on a specific spring resistance predetermining a response threshold. Furthermore, it is possible to interpose a coupling 2 having axial play, between the worm or spindle and the rotor of the drive motor 1, in the region of which coupling the spring-loaded emergency displacement takes place which in turn can be used for the signal release.

With this construction of this drive according to the invention, a space-saving, low noise motion converter can be made available which is particularly economical with regard to the reduction between the drive motor and the motion transmission member and which has a wide range of applications. In particular, a door drive, for example for overhead garage doors, can be made available thereby in a particularly economic manner.

I claim:

1. An arrangement for converting rotational motion into translational motion to open and close a door, gate or window, comprising: a rotational drive; a translational motion transmission means connected to said rotational drive in region of a guide through a coupling; said translational motion transmission means comprising at least two parts subdivided into sections in longitudinal direction; said parts having one end outside said guide and deformable transversely to direction of guidance, each of said parts being guided separately; said parts having another end where said parts are moved in a direction toward one another and held with a space between said parts; each section of one part bridging and extending into two other sections of the other part, each section having teeth meshing with teeth of said two other sections of said other part when said parts are brought together under tension or compression, said guide and shape of said teeth forcing said teeth to remain in mesh when transmitting substantially high tensile and compressive forces; each section being comprised of at least three teeth with two tooth gaps therebetween, said sections being spaced from each other by a further tooth gap between two neighboring sections, an intermediate tooth on one section on one said parts extending into said gap between neighboring sections on the other one of said parts; facing sides of said sections having a screw thread; motor means in said rotational drive and having a driving shaft and a worm wheel mounted on said shaft; said worm wheel meshing with said screw thread.

2. An arrangement as defined in claim 1, including a band with longitudinal axis, said band being deformable transversely to said longitudinal axis, said sections being attached to said band with adhesive means.

3. An arrangement as defined in claim 1, including linkage means for connecting adjacent sections.

4. An arrangement as defined in claim 1, wherein said teeth are comprised of a steep-sided trapezoidal toothing.

5. An arrangement as defined in claim 1, wherein said guide has a longitudinal slot for passage of coupling means having one end connected to said motion transmission means and another end connected through said transmission means to a load to be moved.

6. An arrangement as defined in claim 1, wherein said sections are joined and arranged in form of a band, said sections being comprised of teeth formed from recesses in said band.

7. An arrangement as defined in claim 1, wherein said screw coupling is connected directly to said shaft.

8. An arrangement as defined in claim 1, wherein said teeth are formed with said screw thread running in longitudinal direction of said parts, said thread meshing with said worm wheel.

9. An arrangement as defined in claim 1, wherein said parts terminate in open ends.

10. An arrangement as defined in claim 1, wherein said translational motion transmission means has an end remaining within said guide.

* * * * *